United States Patent [19]

Ogasawara et al.

[11] Patent Number: 4,491,979
[45] Date of Patent: Jan. 1, 1985

[54] COMBINATION ELECTRONIC APPARATUS

[75] Inventors: Hidekazu Ogasawara, Odawara; Takanori Saiin, Kamakura, both of Japan

[73] Assignee: Matsushita Electric Industrial Co., Ltd., Osaka, Japan

[21] Appl. No.: 455,848

[22] Filed: Jan. 5, 1983

[30] Foreign Application Priority Data

| Jan. 14, 1982 | [JP] | Japan | 57-4057 |
| Jan. 18, 1982 | [JP] | Japan | 57-6317 |
| Jan. 18, 1982 | [JP] | Japan | 57-6318 |
| Apr. 28, 1982 | [JP] | Japan | 57-72104 |
| Apr. 28, 1982 | [JP] | Japan | 57-72105 |

[51] Int. Cl.³ .......................... H04B 1/08; H04N 5/64; H05K 5/00
[52] U.S. Cl. .................... 455/344; 455/347; 358/254; 312/7.2; 312/24; 312/26; 312/250
[58] Field of Search .............. 455/344, 347-349, 455/90, 128; 312/7.1, 7.2, 24, 26, 30, 243, 249, 251, 252, 250, 21, 22, 27; 364/705; 358/254; 248/130, 131, 424, 425; 211/163-166

[56] References Cited

U.S. PATENT DOCUMENTS

| 2,571,903 | 10/1951 | Loewi et al. | 312/7.2 |
| 3,184,911 | 5/1965 | Canale et al. | 455/347 |
| 3,704,050 | 11/1972 | Nakae et al. | 312/7.1 |
| 4,120,037 | 10/1978 | Sato | 364/705 |
| 4,237,540 | 12/1980 | Sato | 364/705 |
| 4,396,941 | 8/1983 | Nishimura et al. | 455/344 |

Primary Examiner—Jin F. Ng
Attorney, Agent, or Firm—Spencer & Frank

[57] ABSTRACT

A composite electronic apparatus containing two different electronic devices in a single housing wherein the principal functional parts of the two electronic devices are respectively arranged on two adjacent surfaces of the housing. The housing is rotatable thereby causing the two adjacent surfaces having the principal functional parts arranged thereon to face a forward direction, respectively, in accordance with the different operating conditions of the composite electronic apparatus.

6 Claims, 14 Drawing Figures

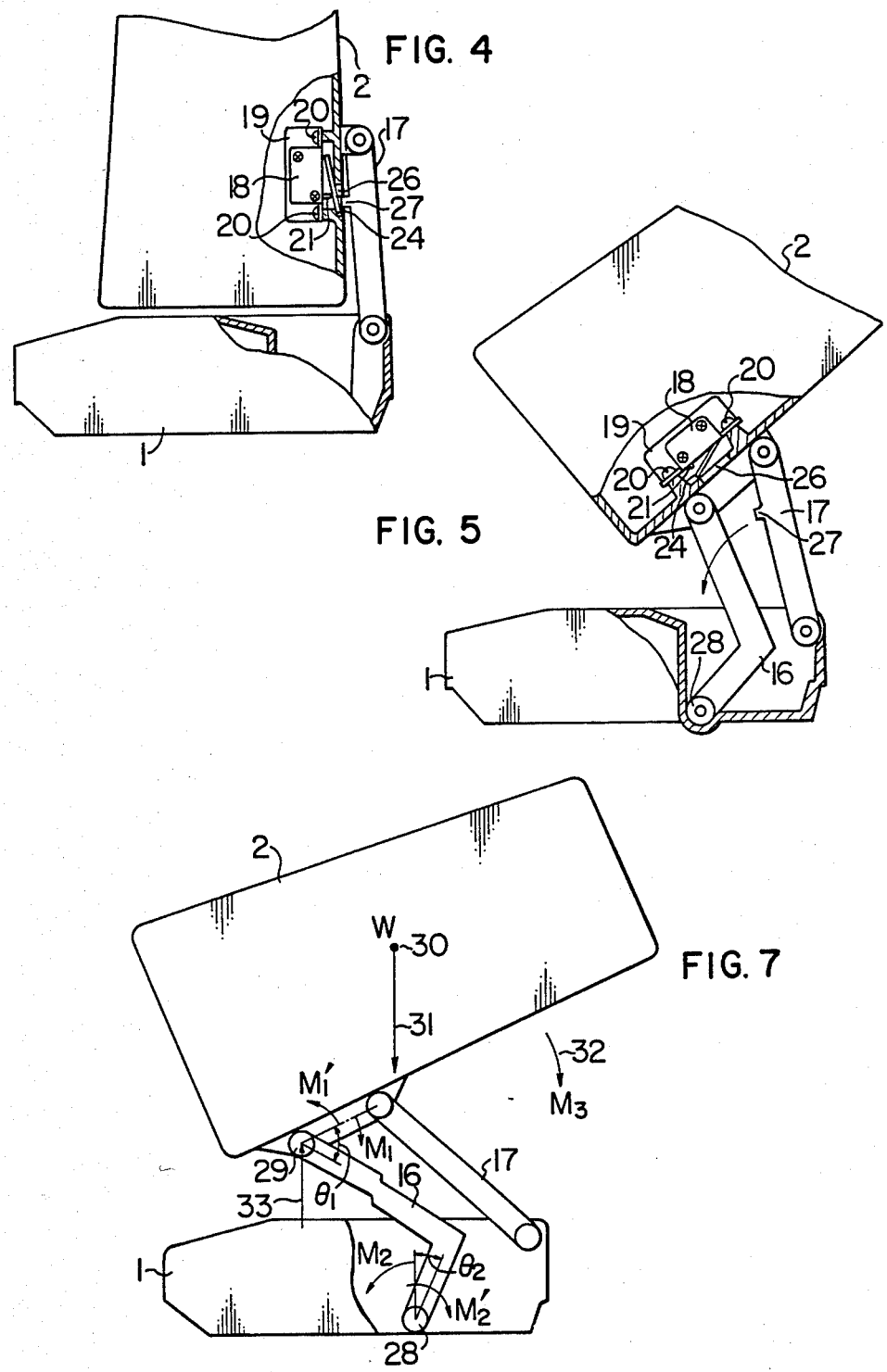

COMBINATION ELECTRONIC APPARATUS

BACKGROUND OF THE INVENTION

Field of the Invention

This invention relates to a composite electronic apparatus containing within the same housing at least two different electronic devices, such as, a television receiver and a radio receiver.

SUMMARY OF THE INVENTION

It is an object of this invention to provide a composite electronic apparatus in which, for example, a main body containing electronic circuits which form a television receiver, a radio receiver and an electronic clock, respectively, is rotatably mounted on a base containing a power supply circuit comprising a rectifying circuit, a smoothing circuit, a power transformer and associated components, and the main body is constructed so that the image display surface of a cathode-ray tube is arranged on one surface of the main body and a front face of a speaker to be used in common by the television receiver and the radio receiver and a time indicating part of the electronic clock are arranged on another surface of the main body which is adjacent to the said one surface at an angle thereto in the direction of rotation of the main body, whereby the television receiver and the electronic clock operate when the main body is positioned so that the image display surface of the cathode-ray tube faces a forward direction (in this position the radio receiver is prevented from operating), while, the television receiver stops operating and the radio receiver and the electronic clock are made operable when the main body is positioned so that the speaker and the time indicating part of the electronic clock face the forward direction.

In accordance with the invention there is provided a multipurpose composite electronic apparatus which is conveniently constructed so that a desired position of the composite electronic apparatus may be set in accordance with the selection of each of the electronic apparatuses composing the composite electronic apparatus and further the transition to a desired position can be performed easily and smoothly.

BRIEF DESCRIPTION OF THE DRAWINGS

FIGS. 4 and 5 are partially broken side views of the composite electronic apparatus of the first embodiment.

FIG. 7 is a side view for illustrating the rotational movement of the composite electronic apparatus of the first embodiment.

DESCRIPTION OF THE PREFERRED EMBODIMENTS

Figure 1:
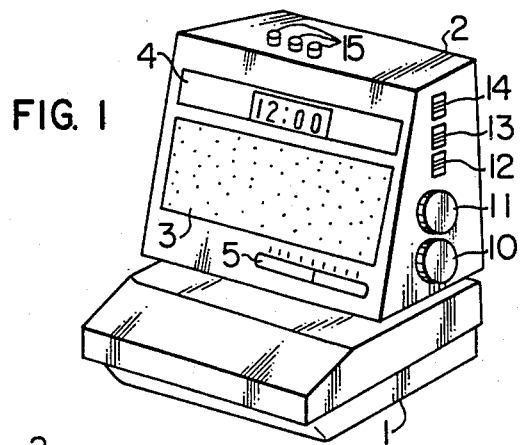
FIGS. 1 and 2 are perspective views showing the external appearance of a composite electronic apparatus according to an embodiment of this invention.
Figure 2:
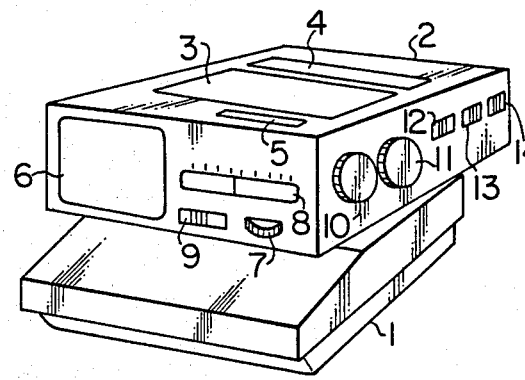

Preferred embodiments of the present invention will now be described with reference to the accompanying drawings. FIG. 1 shows the state of the composite electronic apparatus of this invention where a radio receiver therein is operated, and FIG. 2 shows the state thereof where a television receiver is operated. In the Figures, numeral 1 designates a base of the composite electronic apparatus containing a power supply circuit comprising a power transformer, a rectifying circuit, a smoothing circuit, a voltage stabilizing circuit, etc. Numeral 2 designates the main body of the composite electronic apparatus containing a television receiver circuit, a radio receiver circuit and an electronic clock. There are arranged on a first surface of the main body 2 a speaker 3 to be used by both the television receiver and the radio receiver, a time indicating part 4 of the electronic clock and a radio receiver indicator 5. A cathode-ray tube 6 is disposed in the main body 2 so that the image display surface of the cathode-ray tube 6 is arranged on a second surface of the main body 2 which is adjacent to the first surface at an angle thereto, and there are arranged also on the second surface a television channel selector knob 7, a television receiver indicator 8 and a UHF/VHF band selector knob 9. On a third surface of the main body 2, which is adjacent to the first and second surfaces, there are arranged a power switch and volume control variable resistor knob 10, a radio receiver channel selector 11, a radio band (AM/FM) selector knob 12, a power switch change-over knob 13 and a brightness selector knob 14 for the time indicating part 4 of the electronic clock. A plurality of time setting buttons 15 are arranged on the surface of the main body 2 which is adjacent to the first and third surfaces and opposite to the second surface.

Figure 3:
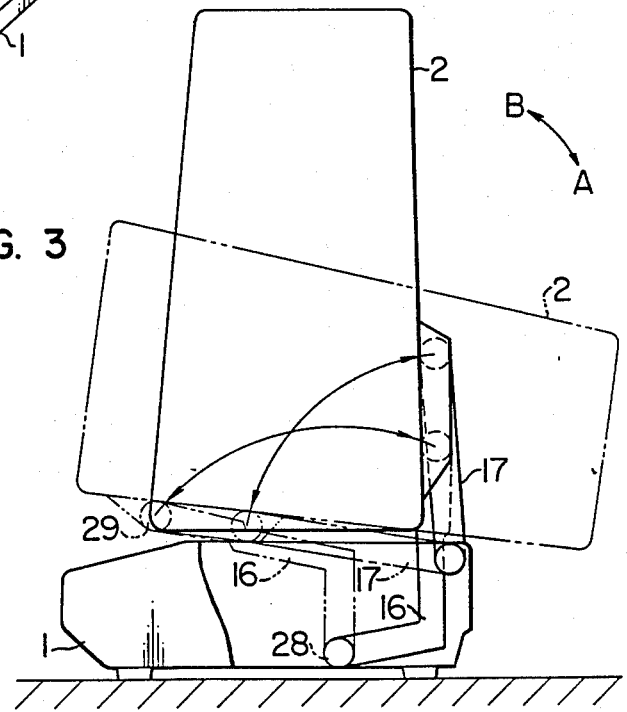
FIG. 3 is a side view of a composite electronic apparatus of the first embodiment of this invention.

With the construction described above, the main body 2 is rotatably mounted on the base 1. FIG. 3 illustrates the mechanism for rotating the main body 2. The main body 2 is rotatably mounted on the base 1 by means of two swing arms 16 and 17 which are in the form of plate members. In other words, each of the swing arms 16 and 17 has both ends thereof rotatably connected to the base 1 and the main body 2, respectively.

FIG. 1 shows the state of the composite electronic apparatus where the radio receiver is made operable. In this case, the first surface having the speaker 3, the time indicating part 4 and the radio receiver indicator 5 arranged thereon comes to the front. In this state, by operating the power switch and volume control variable resistor knob 10 and the channel selector knob 11, it is possible to listen to a radio broadcast from a desired broadcast station. Of course, in this case the electronic clock also operates and the current time is indicated at the time indicating part 4. At the same time, in this position the image display surface of the cathode-ray tube 6 is directed downward to face the base 1, whereby the cathode-ray tube 6 is protected to decrease the possibility that it may become damaged.

Next, when turning from this state to look at and listen to the television receiver, the main body 2 is rotated about a horizontal axis in the direction of the arrow A shown in FIG. 3 relative to the base 1 so that the second surface having the cathode-ray tube 6, the channel selector knob 7, the television indicator 8 and the VHF/UHF band selector knob 9 arranged thereon comes to the front as shown in FIG. 2, thus taking the A-position. With the power switch 13 turned on and the main body 2 rotated to take the A-position, the transfer from the radio receiver operating state to the television receiver operating state is effected automatically, and then, upon operating the band selector knob 9 and the channel selector knob 7, it is possible to look at and listen to a television broadcast from any desired broadcast station. Of course, in this state the electronic clock remains in operation. Then, upon rotating the main body 2 in the direction of the arrow B shown in FIG. 3 relative to the base 1 to take the B-position, it is possible to make the first surface having the speaker 3, the time indicating part 4 and the radio receiver indicator 5 come to the front again as shown in FIG. 1, thereby making it possible to listen to a radio broadcast from any desired broadcast station.

With this construction, in the operating state of each of the television receiver and the radio receiver, the indicators 5 and 8 thereof are respectively positioned to face a forward direction, and besides, since the respective operating functions of the television receiver and the radio receiver are made to be independent of each other, it is possible to elevate the operability of each of the television receiver and the radio receiver. In addition, with the mechanical construction of this composite electronic apparatus, the transfer from one of the operating states to the other and vice versa can be effected easily by means of the swing arms 16 and 17. Further, the rotating operation of the main body 2 can be effected more smoothly, if the rotational shaft parts of the swing arms 16 and 17 are provided with elastic members whose elastic force acts in the direction of rotation of the main body 2.

While, the above-described embodiment has been described with respect to a case where the television receiver, the radio receiver and the electronic clock are contained in the same housing, this invention is not limited to such a case, but this invention can be applied to a case where only the television receiver and the radio receiver are incorporated together in the same housing or other apparatuses are incorporated together in the same housing.

Figure 6:
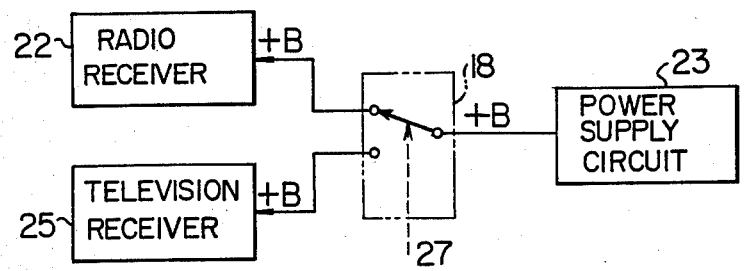
FIG. 6 is a schematic electric circuit diagram of the composite electronic apparatus of the first embodiment.

Next, the construction of a change-over switch section for automatically transferring the electric circuits in response to the rotation of the main body 2 will be described with reference to FIGS. 4 to 6. In the Figures, numeral 18 designates a television/radio receiver change-over switch which is fixed onto a mounting fixture 19. The mounting fixture 19 is fastened with a plurality of screws 20 to a cabinet forming the main body 2 thereby securely attaching the television/radio receiver change-over switch 18 to the main body 2. The change-over switch 18 comprises a projection 21 and an elastic contact piece 24, and a radio receiver circuit 22 is connected to a power supply circuit 23 as shown in FIG. 6 when the contact piece 24 presses the projection 21, while, a television receiver circuit 25 is connected to the power supply circuit 23 when the pressing of the contact piece 24 against the projection 21 is released.

An opening 26 is formed in the cabinet of the main body 2 in opposition to the contact piece 24 of the change-over switch 18 thereby allowing the contact piece 24 to be controlled externally through the opening 26. In this embodiment, a pressing projection 27 is incorporated in the swing arm 17 so that the contact piece 24 is controlled by the swing arm 17 through the pressing projection 27.

FIG. 4 shows a case where the main body 2 is set as shown in FIG. 1 to render the radio receiver operable. In this state, the pressing projection 27 of the swing arm 17 enters the main body 2 through the opening 26 to press the contact piece 24 and then the projection 21, thereby making the change-over switch 18 supply the +B voltage from the power supply circuit 23 to the radio receiver circuit 22. If the main body 2 is rotated from the above-mentioned position to the position for looking at and listening to the television receiver as shown in FIG. 5, the pressing projection 27 is withdrawn from the contact piece 24 to allow the change-over switch 18 to change its state, so that the +B voltage from the power supply circuit 23 is supplied to the television receiver circuit 25 instead of the radio receiver circuit 22. FIG. 5 shows a transient state of the rotation of the main body 2, however, the above-described situation remains unchanged even after the rotational movement of the main body 2 has been completed as shown in FIG. 2. Thus, if the tuning of the television receiver has been preliminarily completed by operation of the channel selector knob 7, at the instant the rotational movement of the main body 2 has been completed it is possible to receive a television broadcast and to obtain the display of a picture on the cathode-ray tube 6. This is also the case when the main body 2 is changed from the position of the television receiver to that of the radio receiver.

In the composite electronic apparatus of this invention, in order to facilitate the rotational operation of the main body 2, a torsion coiled spring is applied as an elastic member to a fulcrum (or joint) 28 between the swing arm 16 and the base 1 and to a fulcrum (or joint) 29 between the swing arm 16 and the main body 2 so that there are produced turning moments $M'_1$ and $M'_2$ for counteracting a turning moment $M_3$, which is caused by the displacement of the center of gravity of the main body 2 when the main body 2 is rotated and tends to cause the main body 2 to rotate, whereby the main body 2 can be brought to rest at an arbitrary position during its rotational movement and at the same time it is made possible to provide the main body 2 with such a degree of stability as to assure its stable operation at the A-position and B-position of the main body 2, respectively.

The structure of these springs will now be described with reference to FIGS. 7 to 10. FIG. 7 shows the state of the main body 2 at an arbitrary position during its rotational momvement. In this state, the weight W of the main body 2 is applied as a force 31 to the base 1 through the swing arms 16 and 17 vertically from the center of gravity 30 of the main body 2, and the force 31 tends to turn the main body 2 in the direction of an arrow 32.

When the main body 2 is moved from the B-position to the A-position, the turning moment $M_3$ changes greatly from a counterclockwise turning moment to a clockwise turning moment due to the displacement of the center of gravity 30 of the main body 2, so that the change of the turning moment makes the operation of the main body 2 very difficult when movement of the main body 2 is effected manually against the turning moment.

Figure 8:
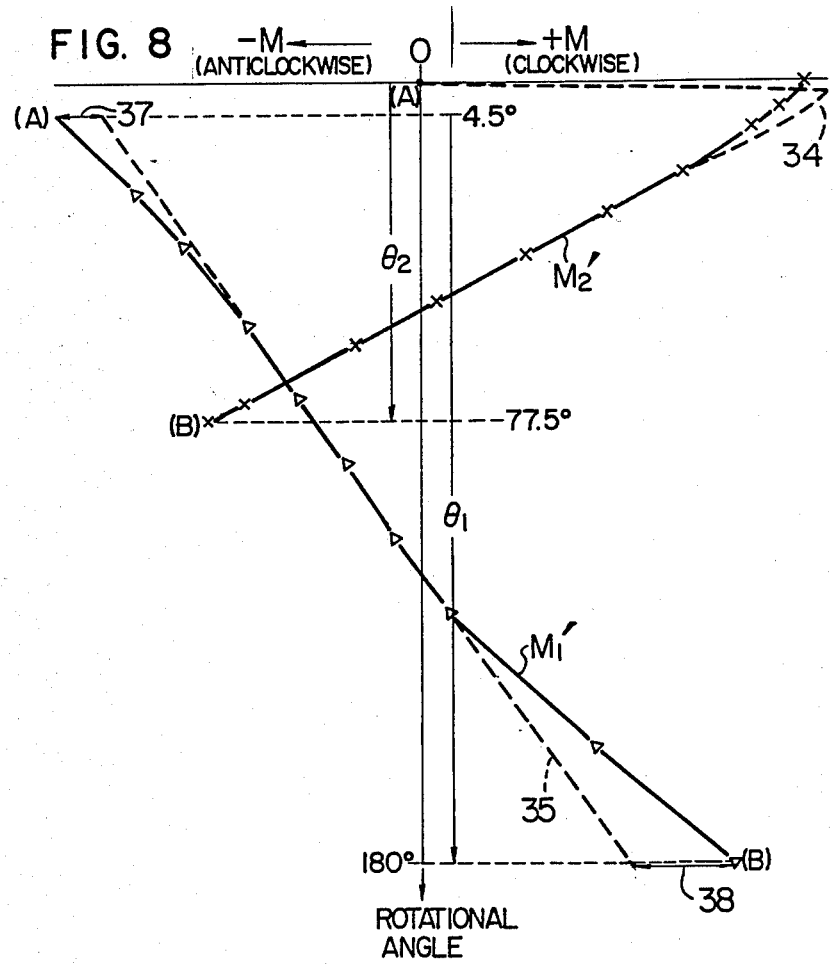
FIG. 8 is a characteristic diagram for illustrating the rotational movement characteristic of the main body of the composite electronic apparatus of the first embodiment.

To bring the main body 2 to rest at the arbitrary position shown in FIG. 7, it is necessary to apply to the fulcrum 29 a force 33, which is equal in magnitude but opposite in sense to the weight W of the main body 2, and a counter turning moment $M'_1$ for counteracting a couple $M_1$ which is produced by the gravity force 31 of the main body 2 and the force 33 applied to the fulcrum 29. In this case, such a force 33 is obtained by applying the turning moment $M'_2$ to the fulcrum 28 between the swing arm 16 and the base 1. In the course of rotating the main body 2 from the A-position to the B-position, the values of the moments $M_1'$ and $M_2'$ required for bringing the main body 2 to rest at an arbitrary position have relationships which are substantially linear functions with respect to the rotational angles $\theta_1$ and $\theta_2$ around the fulcrums 29 and 28, respectively, as shown by the solid lines in FIG. 8. Thus, it is possible to obtain these moments $M'_1$ and $M'_2$ by simple torsion coiled springs. In FIG. 8, the broken lines 34 and 35 respectively show the turning moments around the fulcrums 28 and 29 actually produced by the respective torsion coiled springs.

Figure 9:
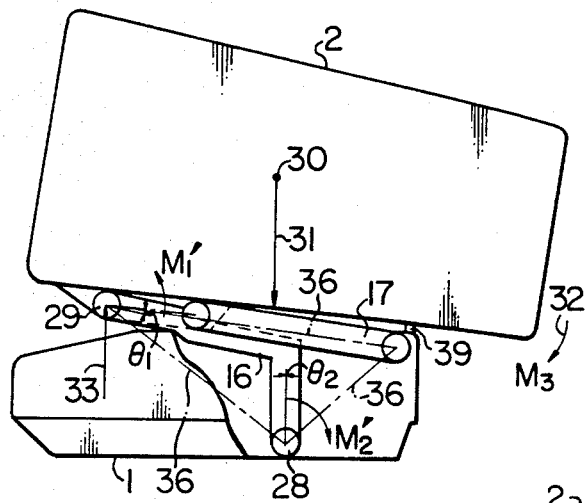
FIGS. 9 and 10 are side views for illustrating the rotational movement characteristic of the apparatus proper of the combination electronic apparatus of the first embodiment.

Then, referring to FIG. 9, if the design is such that the link mechanism composed of the swing arms 16 and 17 and the main body 2 forms a triangle as shown by the dot-and-dash line 36, when the main body 2 is at the A-position, the above-mentioned link mechanism takes a position at dead center with respect to the turning moment $M'_2$, and then the turning moment represented by line 34 around the fulcrum 28 produced by the torsion coiled spring becomes zero apparently. Thus, only a turning moment resulting from the values of the moments represented by line 35 and $M'_1$ at the A-position is applied to the main body 2. As will be understood from FIG. 8, there remains a difference between the moment $M'_1$ and the moment represented by line 35 produced by the torsion coiled spring as shown by numeral 37 at the A-position in FIG. 8, and hence the main body 2 tends to rotate in the direction of the arrow 32 shown in FIG. 9 due its own weight. Therefore, by providing a suitable mechanical stopper 39 between the main body 2 and the base 1 as shown in FIG. 9, it is possible to maintain the main body 2 in a stable condition above the base 1.

Figure 10:
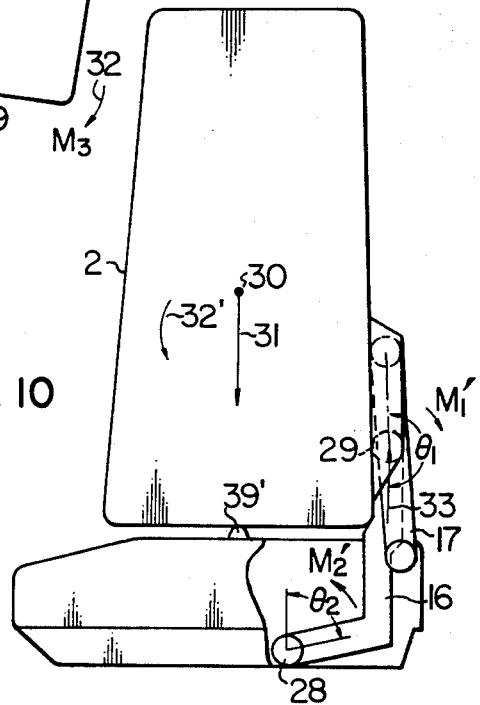

On the other hand, when the main body 2 is at the B-position, there is a difference shown at numeral 38 in FIG. 8 between the necessary moment $M_1'$ for bringing the main body 2 to rest as shown in FIG. 10 and the moment represented by line 35 produced by the torsion coiled spring, whereby the main body 2 tends to rotate in the counterclockwise direction indicated by the arrow 32' in FIG. 10 due to its own weight. Therefore, by providing another suitable mechanical stopper 39' between the main body 2 and the base 1 as shown in FIG. 10, it is possible to maintain the main body 2 in a stable condition above the base 1.

As described above, in accordance with this apparatus, by virtue of two simple torsion coiled springs, it is possible to accomplish a rotational operation of the main body 2 easily with a small force, while maintaining the main body 2 in a stable condition above the base 1 in either of the two operating positions.

The swing arms 16 and 17 rotate between the positions shown by the solid-line and the two-dot chain line in FIG. 3, respectively. Here, one of the swing arms 16 and 17, e.g., the swing arm 16, as chosen in the embodiment, is provided with a coiled spring at each of its rotational shaft portions. With this construction, electric connections between the electronic circuit of the main body 2 and the electric circuit of the base 1 may be attained through the coiled springs. The springs may also serve as elements for controlling the rotation of the main body 2 relative to the base 1. Examples of the construction of these parts will be described with reference to FIGS. 11 and 12.

Figure 11:
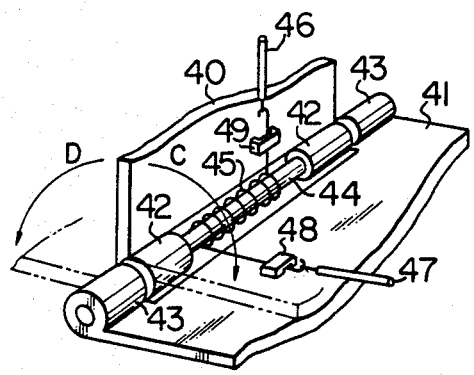
FIGS. 11 and 12 are perspective views showing examples of connecting parts of the composite electronic apparatus of the first embodiment.

Referring firstly to FIG. 11 showing a first example, numerals 40 and 41 designate respectively a first member and a second member which are made of a synthetic resin material and which incorporate knuckles 42 and 43 at their end portions, respectively. In the assembling operation, a shaft 44 is inserted into the knuckles 42 and 43 to provide a rotary joint between the first and second members 40 and 41, and, simultaneously with the insertion of the shaft 44, a spring 45 made of a coil-shaped conductor is mounted on the shaft 44. Then, the ends of the spring 45 are connected respectively to a lead wire 46 led out from the first electric circuit on the side of the first member 40 and a lead wire 47 led out from the second electric circuit on the side of the second member 41, whereby the first and second electric circuits may be connected electrically by means of the spring 45.

The spring 45 is designed so that it remains in a stable state and does not develop any elastic force when the angle made by the first and second members 40 and 41 is 90°, for example, and any attempt to close, for example, the first member 40 from this stable position in the direction C gives rise to a repulsive force for pushing the first member 40 in the opposite direction to open. On the other hand, if the first member 40 is rotated from this stable position in the direction D to open, a resultant repulsive force acts to push the first member 40 in the opposite direction to close. In FIG. 11, numerals 48 and 49 designate respective fixtures for fixing the positions of the ends of the spring 45 at desired positions.

Figure 12:
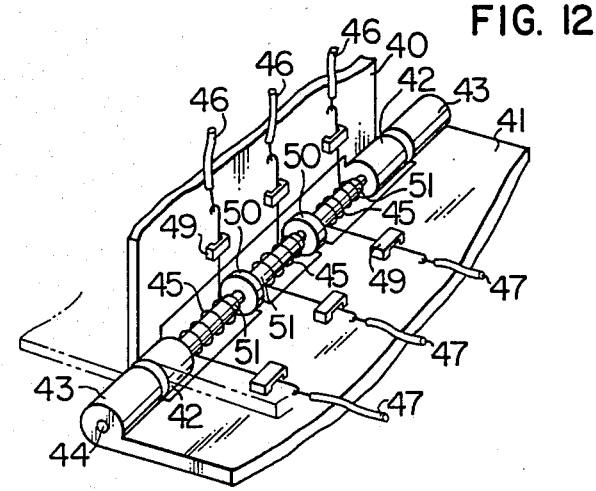

FIG. 12 shows a second example. While the first example shown in FIG. 11 is designed to electrically connect one pair of electric circuits with each other, the second example shown in FIG. 12 is directed to a case where a plurality of pairs of electric circuits are connected electrically with one another. However, the fundamental construction of the second example is the same as that of the first example except: that, in the second example, the number of springs 45 and the number of pairs of electric circuits provided are the same; that insulating ribs 50 are provided between the springs 45 to separate them from one another; and that insulating sleeves 51 are inserted between the shaft 44 and each of the springs 45. Thus, the plurality of electric circuits on the side of the first member 40 can respectively be connected electrically to the plurality of electric circuits on the side of the second member 41 by way of the springs 45 in a way similar to that used in the first example shown in FIG. 11.

Figure 13:
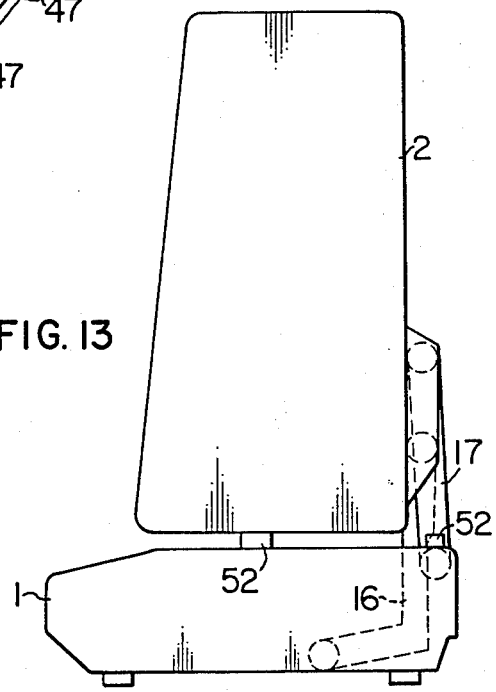
FIGS. 13 and 14 are side views of the composite electronic apparatus of a second embodiment of this invention which partially modifies the construction of the composite electronic apparatus of the first embodiment.
Figure 14:
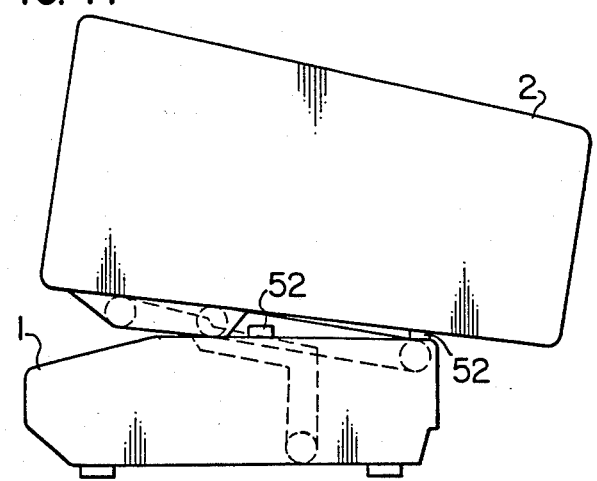

With the construction shown in FIGS. 1 to 3, if the rotation and simultaneously the transverse movement perpendicular to the plane of rotation of the main body 2 should be regulated solely by the swing arms 16 and 17, when operating the radio channel selector knob 11 to operate the radio receiver or when operating the time setting buttons 15, the main body 2 is apt to stagger on the base 1, thus making the operation of the main body 2 unstable. In the same way, the main body 2 is apt to stagger on the base 1 when operating the television receiver. Thus, for the purpose of preventing the main body 2 from wobbling on the base 1, a plurality of suitable cushion members 52 may be provided on the base 1 to prevent the wobbling of the main body 2, as shown in FIGS. 13 and 14.

We claim:

1. A composite electronic apparatus containing at least first and second electronic devices having independent functions, said composite apparatus being positionable to face a forward direction, comprising:
   a base;
   a main body housing said first and second electronic devices, said main body having a first surface on which the principal functional parts of said first electronic device are mounted and a second surface adjacent said first surface on which the principal functional parts of said second electronic device are mounted; and
   supporting means rotatably supporting said main body on said base for rotation of said main body about a horizontal axis extending substantially perpendicular to said forward direction, said main body being rotatable to a first position in which said first surface on which the principal functional parts of said first electronic device are mounted faces said forward direction and said second surface on which the principal functional parts of said second electronic device are mounted faces toward said base, said main body being further rotatable to a second position in which said second surface faces said forward direction and said first surface faces away from said base.

2. An apparatus according to claim 1, wherein said first electronic device is a radio receiver and said second electronic device is a television receiver.

3. An apparatus according to claim 1, further comprising change-over switch means for selectively operating said functional part arranged respectively on said first and second adjacent surfaces of said main body, said change-over switch means being operated in accordance with the rotational position of said main body.

4. An apparatus according to claim 1, wherein said supporting means include elastic members for controlling the rotation of said main body, said elastic members assisting the transition of said main body during the rotation thereof and maintaining said main body in a stable state at the positions thereof where said first and second surfaces face said forward direction, respectively.

5. An apparatus according to claim 1, wherein said supporting means include a first member, a second member rotatably coupled to said first member by rotational shaft means, and electrically conductive spring means mounted on said rotational shaft means to control the rotational movement of said first member, whereby electronic circuitry arranged on the side of said first member is electrically connected to electronic circuitry arranged on the side of said second member through said spring means.

6. An apparatus according to claim 1, further comprising cushion means secured to said base, said cushion means providing support for said main body when said main body is in said first and second positions.

* * * * *